ated July 2, 1957

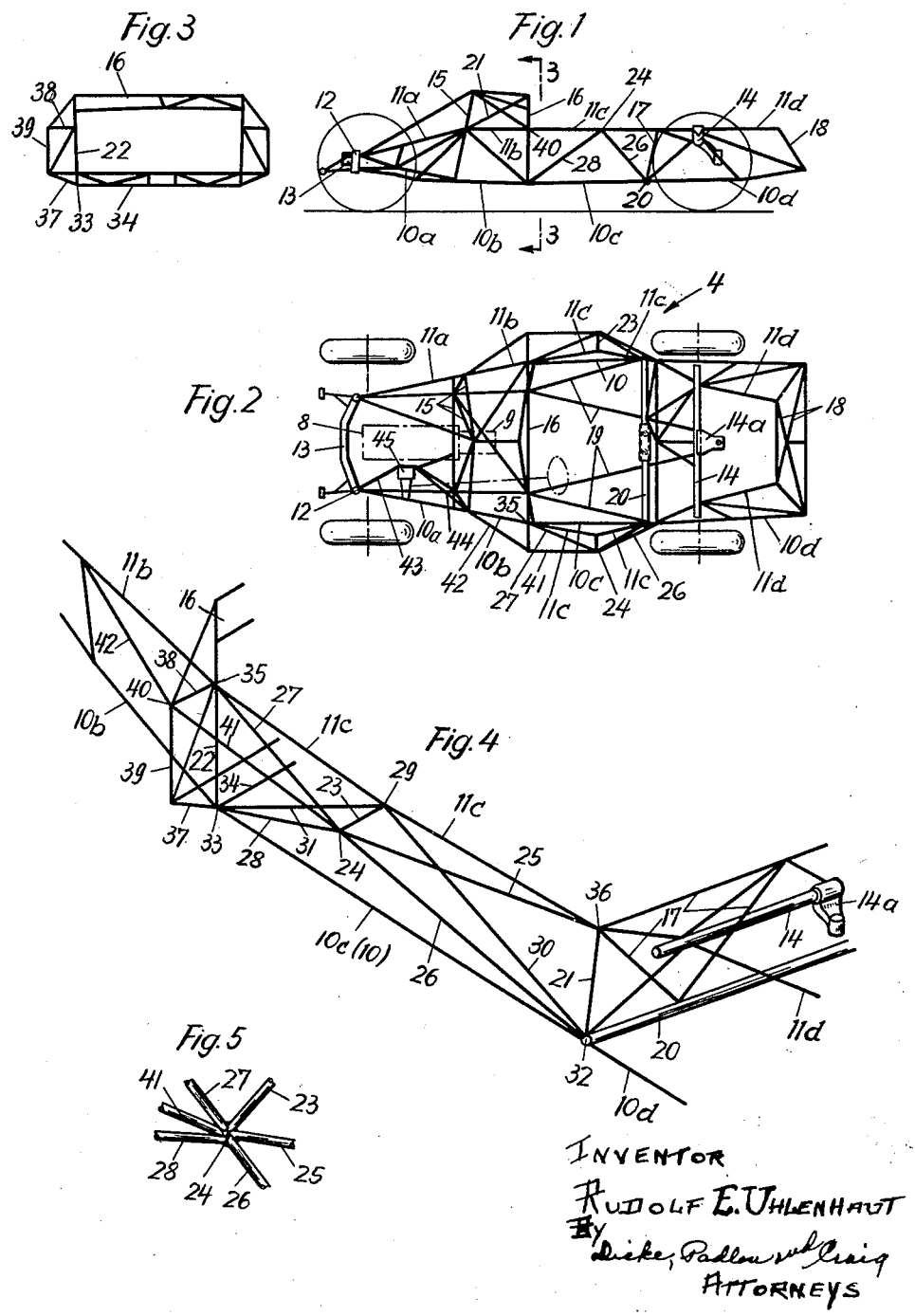

2,797,954

MOTOR VEHICLE BODY IN FRAMEWORK CONSTRUCTION, ESPECIALLY FOR SPORT CARS

Rudolf E. Uhlenhaut, Stuttgart, Germany, assignor to Daimler-Benz Aktiengesellschaft, Stuttgart-Unterturkheim, Germany Application July 7, 1953, Serial No. 366,599

Claims priority, application Germany July 11, 1952

6 Claims. (Cl. 296—28)

This invention relates to a framework construction for motor vehicle bodies and more particularly to self-supporting bodies for sport cars with doorless continuous side walls without roof bracing.

The principal object of the present invention is to provide a body construction in which the center section between the axles is so rigid that the stability of the body is such as to be capable of taking up the high stresses occurring thereon without impermissible high distortion and without it being much too heavy in weight.

To this end the invention provides a framework construction in which the side wall is formed and braced by girders running in the manner of a spatial body. To accomplish this there are by way of example diagonal braces directed from the corners of a side wall face, extending over the center section of the vehicle and bounded essentially by girders, to an intersection located outside of said face and forming, for example, the peak of a pyramid. This intersection is suitably braced against the girders, directly connecting the corners of said side wall face, by a girder directed against said face, and the further intersection thus formed being on its part additionally braced against the corner points of said side face.

Another important object of the invention is to provide such a construction that the side wall joins as rigidly as possible one or more cross-frames likewise formed of girders and forming a rigid twist-proof system therewith.

A further object of the invention is to provide such a form of framework construction which is capable of transmitting the springing forces and other main forces occurring on the vehicle in a particularly advantageous manner on the framework structure.

Other objects and features of the invention will become apparent from the following description taken in connection with the accompanying drawing which illustrates a preferred form of the invention, and in which—

Fig. 1 is a schematic side view of the motor vehicle body provided by the invention, Fig. 2 is a top plan view of the subject matter shown in Fig. 1, Fig. 3 is a view taken in the plane 3—3 in Fig. 1, Fig. 4 is a perspective view showing the side wall construction in the direction of the arrow 4 and Fig. 5 an intersection point of the framework structure.

In the construction illustrated in the drawing, the framework comprises a lower side girder 10 or side frame member 10 made up of a plurality of struts 10a, 10b, 10c, and 10d, located on either side of the vehicle and continuously extending over the entire length thereof. These two girders converge within the range of the front axle and are connected to the upwardly extending ends of the relatively strong crossrails 13 serving for suspending the road wheels. Cross bracing of the oppositely located side walls, in addition to the front cross-rail 13 and a cross-rail 14, located within the range of the rear axle, is accomplished by means of frames of which the frames 15 and 16 brace the forward third of the vehicle body, whereas the cross-frame structures 17 and 18 serve for bracing the rearward third of the vehicle. The driver's seat is located between the frames 16 and 17 in the central third of the vehicle. The frames 15 and 16 are extended beyond the upper side girder 11a, 11b, and confine the space accommodating engine 8 and transmission 9. Along with this they are braced by struts against each other as well as against the front cross-rail 13 as clearly shown on the drawing. Similar braces are provided between both the rear frames 17 and 18 and the cross-rail 14 as indicated on the drawing. In addition, the frames 16 and 17 are braced against each other by floor struts 19 for example. The lower bounds of the cross-frame structure 17 are formed by a cross-rail 20 which connects the lower side girders 10 of the framework with each other, and serves in conjunction with the cross-rail 14 for accommodating the rear axle drive gearing. The springing of the rear axle which, for example, is formed of half-axles is suitably supported on the cross-rail 14 located at a higher level and which may also support the axle gear case at 14a. The cross-rails 14 and 20 are separately braced against each other.

The novel construction of the side wall members is clearly shown in Fig. 4. The upper side girder 11 (11a–d) and the lower side girder 10 (10a–d) are connected together within the range of the rear frame structure 17 by a vertical strut 21 and within the range of the forward frame structure 16 by a strut 22. From the center of the slightly outwardly curved upper girder 11 extends a strut 23 about horizontally and outwardly, the end 24 of this strut forming the peak of a pyramid, the corners of which are established by the diagonal struts 25, 26, 27 and 28. Further diagonal struts 30 and 31 extend from the intersection point 29 of the strut 23 to the corner points 32 and 33 of the cross-rails 20 and 34 of the cross-frame structures 17 and 16. The base of the pyramid is consequently formed by the corner points 32, 33, 35, 36. All struts may be formed by rods or tubes brazed or welded together in points of intersection as shown by way of example in Fig. 5 for the intersection point 24.

In the plane of the forward cross-frame 16 and starting from the corner points 33 and 35 are further provided essentially horizontally and outwardly directed struts 37 and 38 which are connected together by a vertical strut 39 and their upper intersection point is connected by a further strut 41 with the intersection point 24. A further strut 42 braces the intersection point against the forward portion 11b of the upper girder 11.

As clearly shown on the drawing, the side wall between the frame structures 16 and 17 forms a spatial strut structure ensuring high rigidity and stability notwithstanding the fact that roof bracing is dispensed with. This spatial structure is extended by the struts 41 and 42 towards the front and joins the frame structure 16 within the points of intersection 33, 35, 40 arranged in a triangle with the cross-section of a spatial structure.

Further, the numerals 43, 44 indicate a specific strut bracing for the steering gear arrangement 45.

If occasion arises, the structure may also be braced by further struts in that, for example, similarly as within the range of the upper side girder, further bracings are also provided within the range of the lower side girder, so that the side wall in its full width and height between the frame structures 16 and 17 is nearly formed as a double-walled structure. To this end similar struts as the struts 37 and 38 may, for example, be provided in the plane of the cross-frame structure 17, and the ends of these struts may be connected with the intersection point 24 and with a corresponding lower intersection point and/or with the ends of the struts 37, 38. The spatial bracing may likewise be extended beyond the rearward frame structure 17. The outer skin may be attached to the outer struts in any suitable manner.

What I claim is:

1. A motor vehicle body in framework construction having a wall in framework construction laterally delimiting the interior of the motor vehicle body comprising upper and lower longitudinal strut members extending essentially in one plane in the longitudinal direction of the vehicle, cross members connecting said upper and lower members with one another, obliquely and outwardly directed strut members extending from the points of intersection of said cross members with said longitudinally running members in the direction to a common point located outside the plane of said longitudinal strut members and said cross members whereby said longitudinally running strut members, said cross members and said obliquely running strut members form essentially a pyramid.

2. The motor vehicle body of claim 1, wherein said obliquely running strut members intersect each other at the peak of said pyramid, with a further strut member extending essentially perpendicularly from the peak of said pyramid to a point in said plane, and further strut members extending from said point to points of intersection of cross members and longitudinally extending strut members.

3. A motor vehicle body made of framework construction having side walls laterally delimiting the interior space of the motor vehicle body, each of said side walls comprising upper and lower longitudinal strut members extending one above the other lengthwise of the vehicle, cross members connecting said upper and lower strut members with each other, obliquely and outwardly directed strut members extending from the points of intersection of said cross members with said longitudinal strut members to a common point located outside of said upper and lower longitudinal strut members whereby said longitudinal strut members, said cross members and said obliquely running strut members form substantially a pyramid, said obliquely and outwardly directed strut members joining each other at the peak of said pyramid, and at least one additional strut member connecting said peak with one of said longitudinal strut members.

4. A motor vehicle body having side walls laterally delimiting the interior space of the motor vehicle body, each of said side walls being made of framework construction including an upright longitudinal truss and, on the outside thereof, a horizontal longitudinal truss, said trusses having common strut members extending lengthwise of the vehicle, said framework construction further including diagonal strut members connecting said trusses and extending at an angle to the planes of said trusses.

5. A motor vehicle body having a pair of side walls delimiting laterally the interior space of the vehicle, each of said side walls consisting of a truss composed of a plurality of rigidly connected strut members, part of said plurality of strut members extending along the edges of an imaginary pyramid having a base constituting an inner central side wall portion and having an apex pointing outwardly, another one of said strut members extending from said apex inwardly to a point located substantially in said base, another part of said plurality of strut members extending from said point to the corners of said base.

6. The motor vehicle body according to claim 5 having a transverse truss composed of strut members and having at least one of the same in common with each of said side walls, the strut member common to said transverse truss and to said side wall constituting a side of said base, said transverse truss projecting outwardly beyond said base, at least one of said struts extending from the outer end of said transverse truss to said apex.

References Cited in the file of this patent

UNITED STATES PATENTS

| | | |
|---|---|---|
| 1,876,905 | Freeman et al. | Sept. 13, 1932 |

FOREIGN PATENTS

| | | |
|---|---|---|
| 475,172 | France | Feb. 2, 1915 |
| 676,182 | France | Nov. 18, 1929 |
| 142,604 | Great Britain | May 13, 1920 |
| 244,921 | Italy | Mar. 29, 1926 |

OTHER REFERENCES

Article, "Europe's Largest Automobile Show," in "Automotive Industries," April 15, 1948. Gatford illustration on page 30 of 5 pages.

Article, "That Exciting New Jaguar," in "The Autocar," July 13, 1951, pages 819–821.